Aug. 12, 1952      G. A. FORD      2,606,746
WIRE LINE STUFFING BOX
Filed May 26, 1948
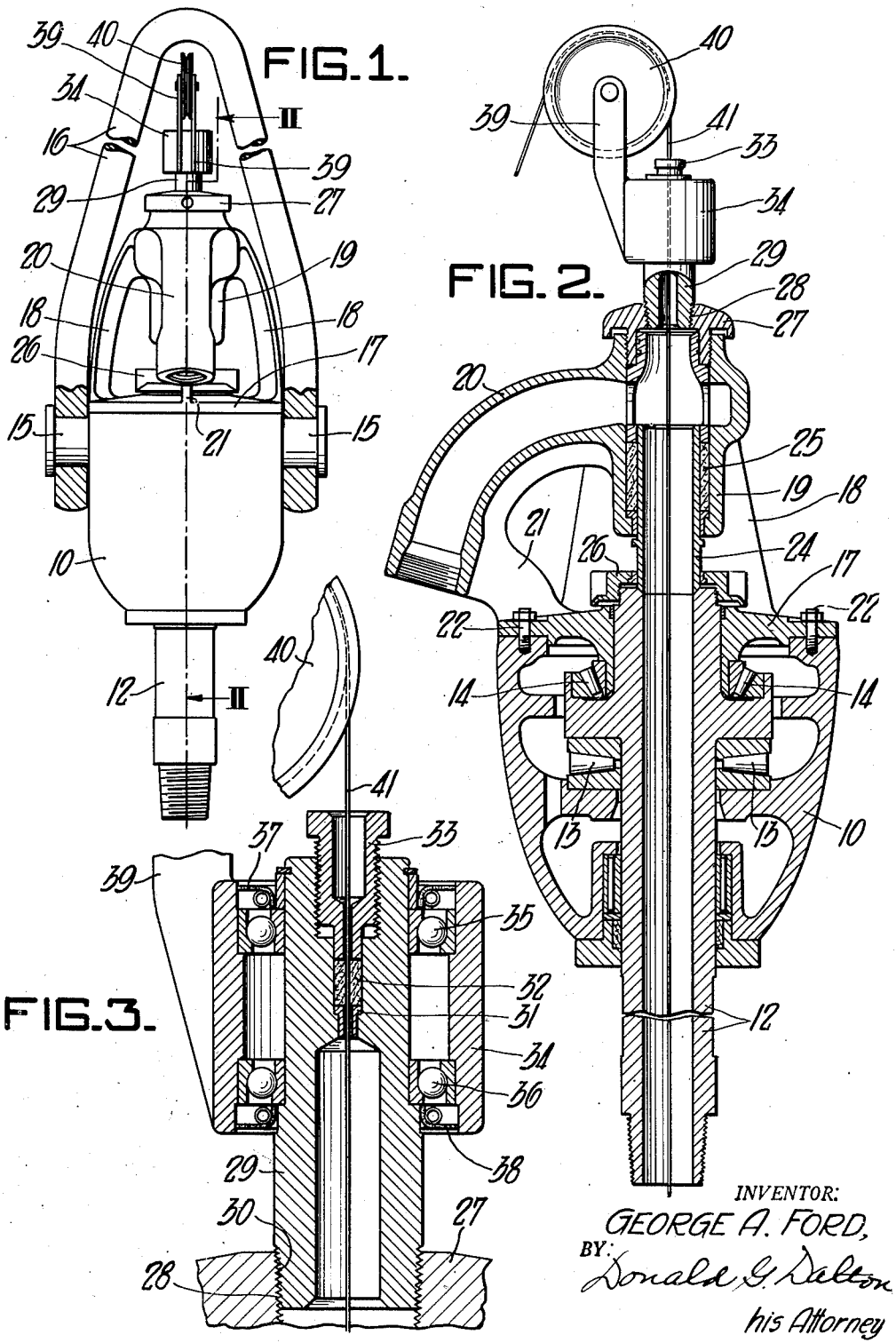
INVENTOR:
GEORGE A. FORD,
BY Donald G. Dalton
his Attorney Patented Aug. 12, 1952

2,606,746

UNITED STATES PATENT OFFICE 2,606,746

WIRE LINE STUFFING BOX

George A. Ford, San Fernando, Trinidad, British West Indies, assignor to United States Steel Company, a corporation of New Jersey Application May 26, 1948, Serial No. 29,207

4 Claims. (Cl. 255—25)

This invention relates to wire line stuffing boxes for use in well drilling equipment.

Often there is need during the drilling of a well, to insert various instruments into the drill hole, such as instruments that indicate the angle by which the hole is inclined from the vertical. In usual previous practices with which I am familiar, it has been necessary to stop mud circulation through the drill hole and detach the grief stem and swivel from the drill pipe before inserting instruments into the hole. The instrument is then dropped by gravity through the mud filled drill pipe. This practice has disadvantages that the operation is cumbersome and time consuming and circulation of mud through drill hole is interrupted for a considerable period, which is unsafe in some wells.

An object of the present invention is to provide improved mechanism which, in conjunction with properly designed rotary swivels, enables instruments to be inserted into drill holes without disconnecting the swivel and grief stem from the drill pipe or interrupting mud circulation for any significant length of time.

A further object of the invention is to provide improved mechanisms which, in conjunction with properly designed swivels, enable mud circulation to be maintained while an instrument is lowered into a drill hole, the instrument being carried into the hole on a descending mud stream.

A further object of the invention is to provide wire line stuffing boxes for installation on swivels of the type which have a through longitudinal passage, whereby instruments may be lowered on a wire that passes through the stuffing box and swivel without disturbing connections to the drill pipe beneath the swivel.

In accomplishing these and other objects of the invention, I have provided improved details of structure, a preferred form of which is shown in the accompanying drawing wherein:

Figure 1 is a side elevational view of a rotary swivel having installed thereon a wire line stuffing box embodying features of the present invention;

Figure 2 is an enlarged vertical sectional view taken substantially on line II—II of Figure 1; and Figure 3 is an enlarged vertical sectional view of the stuffing box.

The stuffing box of the present invention is especially suited for use in conjunction with swivels of the type described and claimed in application Serial No. 4,567, filed January 27, 1948, by August R. Maier and assigned to the assignee of the present application, now Patent No. 2,537,683. Therefore, for convenience I shall describe the stuffing box as employed on a swivel of such design. However, it is apparent that the stuffing box may be used in conjunction with swivels of other designs which have a through passage, and I do not wish use of the stuffing box to be limited to any specific design of swivel.

The swivel illustrated comprises a housing 10, and a tubular body 12 rotatably supported in said housing on main bearings 13 and auxiliary bearings 14. The walls of said housing have integral trunnions 15 about which a bail 16 is pivotally mounted. The lower end of body 12 supports the drill string and the swivel is suspended from a suitable hook that engages bail 16. This much of the structure is typical of rotary swivels and hence a more detailed description is deemed unnecessary.

In accordance with the invention described and claimed in the aforesaid Maier application, the housing cap and goose neck are formed as an integral piece. Said integral piece comprises a base 17, a pair of risers 18 upstanding from opposite edges of said base, a vertical bearing sleeve 19 carried by said risers and spaced above said base, a tubular goose neck 20 integral with a side wall of said bearing sleeve and an integral web 21 connecting the lower portion of said goose neck and said base. Base 17 is fixed to housing 10 by any suitable means such as bolts 22. Wash pipe 24 is removably coupled to the upper end of body 12 to rotate therewith and is rotatably received in packing rings 25, which are stationary in sleeve 19.

The wash pipe and packing rings are preassembled as a unit, together with a cage 26. The coupling which joins the wash pipe and body is accessible in the space between base 17 and bearing sleeve 19.

The end of bearing sleeve 19 above goose neck 20 is open for axial insertion and removal of the wash pipe assembly without disturbing the goose neck. A removable closure 27 normally covers this opening. Said closure has a central opening 28 for receiving the stuffing box of the present invention. When the stuffing box is not used, as during normal drilling operations, opening 28 is closed by a suitable plug. It is seen that the swivel has a continuous longitudinal passage which may be closed either by the plug or the stuffing box.

The stuffing box of the present invention comprises a nipple 29 which has external threads 30 for engagement with opening 28 in the swivel closure. Said nipple has a central constriction into which is fitted a bushing 31 and packing 32. A gland 33 is threaded into the upper end of nipple 29 and compresses packing 32 against bushing 31. The gland, packing and bushing thus provide a passage that communicates with the swivel passage.

An integral bearing housing and sheave support 34 is rotatably mounted on the exterior of nipple 29, preferably being carried on antifriction bearings 35 and 36. Preferably upper and lower grease retaining rings 37 and 38 are fixed in the top and bottom of the bearing housing. The sheave support comprises upstanding arms 39 on which a sheave 40 is rotatably mounted. The upward extension of the center line of the passage through the gland and bushing is tangential with the inner circumferential edge of the sheave.

Wire 41, preferably piano wire, is threaded over sheave 40 and through gland 33, packing 32 and bushing 31. Said wire may support any type of instrument which it is desired to lower into the drill hole.

For inserting an instrument into the drill hole, wire 41 is first threaded through the stuffing box in the manner just described and the instrument attached thereto. Circulation of mud is stopped briefly and the plug is removed from opening 28. The instrument is inserted into the swivel passage through said opening, which is then closed by attaching the stuffing box thereto. Circulation of mud is then resumed. The descending stream of mud carries the instrument into the drill hole and the desired information is obtained without further interrupting the mud circulation. When the instrument has served its purpose, it may be withdrawn by drawing up wire 41 over sheave 40 by any suitable means, after which the stuffing box and instrument are removed and the plug replaced.

It is seen that mud circulation is interrupted only during the brief intervals required to interchange the plug and stuffing box on the swivel. There is no need to disconnect the swivel and grief stem from the drill pipe, thus greatly simplifying the operation. Therefore, by the present invention I have economically and efficiently overcome the principal disadvantages previously encountered in inserting instruments into drill holes.

While I have shown and described but a single embodiment of the present invention, it is apparent that modifications may arise. Therefore I do not wish to be limited by the disclosure set forth, but only by the scope of the appended claims.

I claim:

1. In combination with a rotary drilling swivel having a longitudinal passage and an opening in the top furnishing access to said passage, a stuffing box closing said opening, a sheave, and means rotatably mounting said sheave on said stuffing box, said stuffing box including a tubular nipple affixed in the swivel opening, a tubular bushing affixed in the lower portion of the bore of said nipple, packing in the bore of said nipple supported on said bushing, and a gland received in the upper portion of the bore of said nipple and compressing said packing, said gland, packing and bushing providing a passage through said nipple, the upward extension of whose center line is tangential with said sheave, said last named passage communicating with said swivel passage for insertion of an instrument supporting wire.

2. In combination with a rotary swivel having a longitudinal passage and an opening in the top furnishing access to said passage, a stuffing box closing said opening, said stuffing box including a tubular nipple affixed in the swivel opening, a tubular bushing affixed in the lower portion of the bore of said nipple, packing in the bore of said nipple supported on said bushing, and a gland received in the upper portion of the bore of said nipple and compressing said packing, a bearing housing rotatably supported on the exterior of said nipple, a sheave, and means on said bearing housing rotatably mounting said sheave, said gland, packing and bushing providing a passage through said nipple, the upward extension of whose center line is tangential with said sheave, said last named passage communicating with said swivel passage for insertion of an instrument supporting wire.

3. A wire line stuffing box comprising a tubular nipple adapted to be affixed in a swivel, a tubular bushing affixed in the lower portion of the bore of said nipple, packing supported on said bushing, a gland affixed in the upper portion of the bore of said nipple and compressing said packing, a bearing housing rotatably supported on the exterior of said nipple, a sheave, and means on said bearing housing rotatably mounting said sheave, said gland, packing and bushing providing a passage through said nipple, the upward extension of the center line of said passage being tangential with said sheave.

4. A wire line stuffing box comprising a tubular nipple adapted to be fixed in a swivel, a tubular bushing affixed in the lower portion of the bore of said nipple, packing supported on said bushing, a gland affixed in the upper portion of the bore of said nipple and compressing said packing, a bearing housing, antifriction bearings rotatably supporting said bearing housing around the exterior of said nipple, arms upstanding from said bearing housing, and a sheave rotatably supported on said arms, said gland, packing and bushing providing a passage through said nipple, the upward extension of the center line of said passage being tangential with said sheave.

GEORGE A. FORD.

REFERENCES CITED

The following references are of record in the file of this patent:

UNITED STATES PATENTS

| Number | Name | Date |
|---|---|---|
| 1,499,024 | Miller | June 24, 1924 |
| 2,082,010 | Lane et al. | June 1, 1937 |
| 2,098,518 | Pivoto | Nov. 9, 1937 |
| 2,104,270 | Owsley | Jan. 4, 1938 |
| 2,164,606 | Bozeman | July 4, 1939 |
| 2,176,323 | Bowen et al. | Oct. 17, 1939 |
| 2,283,048 | Collett, Jr. | May 12, 1942 |